(12) United States Patent
Kikuta

(10) Patent No.: US 7,537,163 B2
(45) Date of Patent: May 26, 2009

(54) IMAGE FORMING APPARATUS

(75) Inventor: Masayoshi Kikuta, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 246 days.

(21) Appl. No.: 11/397,855

(22) Filed: Apr. 5, 2006

(65) Prior Publication Data
US 2007/0119937 A1 May 31, 2007

(30) Foreign Application Priority Data
Nov. 25, 2005 (JP) ............................. 2005-339552

(51) Int. Cl.
*H02P 1/00* (2006.01)
(52) U.S. Cl. .................. 235/462.3; 235/462.01
(58) Field of Classification Search .............. 235/462.3; 713/323, 330, 340
See application file for complete search history.

(56) References Cited

U.S. PATENT DOCUMENTS

| | | | | |
|---|---|---|---|---|
| 5,841,362 | A * | 11/1998 | Nakamura et al. | 382/100 |
| 6,151,652 | A * | 11/2000 | Kondo et al. | 713/300 |
| 6,260,111 | B1 * | 7/2001 | Craig et al. | 711/115 |
| 7,352,486 | B2 * | 4/2008 | Tsuchiya et al. | 358/1.15 |
| 2003/0025930 | A1 * | 2/2003 | Tateyama | 358/1.14 |
| 2003/0030412 | A1 * | 2/2003 | Matsuda et al. | 320/127 |
| 2005/0138447 | A1 * | 6/2005 | Kobayashi et al. | 713/300 |
| 2005/0139591 | A1 * | 6/2005 | Takamatsu et al. | 219/663 |
| 2005/0212887 | A1 * | 9/2005 | Tanaka et al. | 347/116 |
| 2005/0237399 | A1 * | 10/2005 | Endo | 348/231.99 |
| 2007/0058190 | A1 * | 3/2007 | Harumichi | 358/1.13 |
| 2007/0097424 | A1 * | 5/2007 | Mizuno | 358/1.15 |

FOREIGN PATENT DOCUMENTS

| | | |
|---|---|---|
| JP | A 2000-309142 | 11/2000 |
| JP | A 2000-353032 | 12/2000 |

* cited by examiner

*Primary Examiner*—Edwyn Labaze
(74) *Attorney, Agent, or Firm*—Oliff & Berridge, PLC

(57) ABSTRACT

An image forming apparatus having a communication interface receives image data through the communication interface to form an image. The image forming apparatus includes a power supply unit, a states monitor unit, and a mode switch unit. The power supply unit supplies electric power either in an operation mode in which the electric power necessary to form the image is supplied or in a power saving mode in which stand-by electric power is supplied. The states monitor unit monitors a connection state and a non-connection state of the communication interface. In the power saving mode, the mode switch unit switches the power supply unit to the operation mode, in response to detection by the states monitor unit of either of a change from the non-connection state to the connection state or a change from the connection state to the non-connection state.

6 Claims, 8 Drawing Sheets

IMAGE FORMING APPARATUS

BACKGROUND

1. Technical Field

The present invention relates to an image forming apparatus having a power saving function.

2. Related Art

Recently the image forming apparatus having a power saving function is widely used in printers and copying machines. For example, it is known that a controller including a determination unit and an automatic setting unit. For a parallel interface control circuit, a serial interface control circuit, a network interface control circuit, and the like which are of the communication interface control circuit, the determination unit determines whether a computer is connected to each of communication interface control circuits or not. When the determination unit determines that the computer is not connected to the communication interface control circuit, the automatic setting unit individually sets the communication interface control circuit in a power saving mode. In the controller, negotiation is required for the connection between the communication interface and the computer, and it is determined whether the connection with the computer is completed or not according to the negotiation status. When a signal is inputted to the interface switched to the power saving mode, the power saving mode is automatically released.

In a peripheral device (for example, printer), such as USB (Universal Serial Bus) and IEEE (American Institute of Electrical Engineers) 1394, which has the communication interface including a power line for indicating a potential a predetermined value or more when the communication is enabled, for example, it is known that a peripheral device which monitors the potentials of the power lines of the communication interfaces and the energy saving of the peripheral device is performed when the potential of the power line is decreased a predetermined value or less.

SUMMARY

An aspect of the image forming apparatus of the present invention has a communication interface which mediates data communication, the image forming apparatus receiving image data through the communication interface to form an image based on the received image data, the image forming apparatus including: a power supply unit which supplies electric power in any one of power supply modes of an operation mode in which the electric power necessary to form the image is supplied, and a power saving mode in which stand-by electric power is supplied; a states monitor unit which monitors a connection state and a non-connection state of the communication interface; and a mode switch unit which switches the power supply unit to the operation mode, in response to detection by the states monitor unit of either of a change from the non-connection state to the connection state or a change from the connection state to the non-connection state, when the power supply unit is in the power saving mode.

BRIEF DESCRIPTION OF THE DRAWINGS

Embodiment(s) of the present invention will be described in detail based on the following figures, wherein.

DETAILED DESCRIPTION

Embodiment(s) of the present invention will be described below with reference to the drawings.

Figure 1:
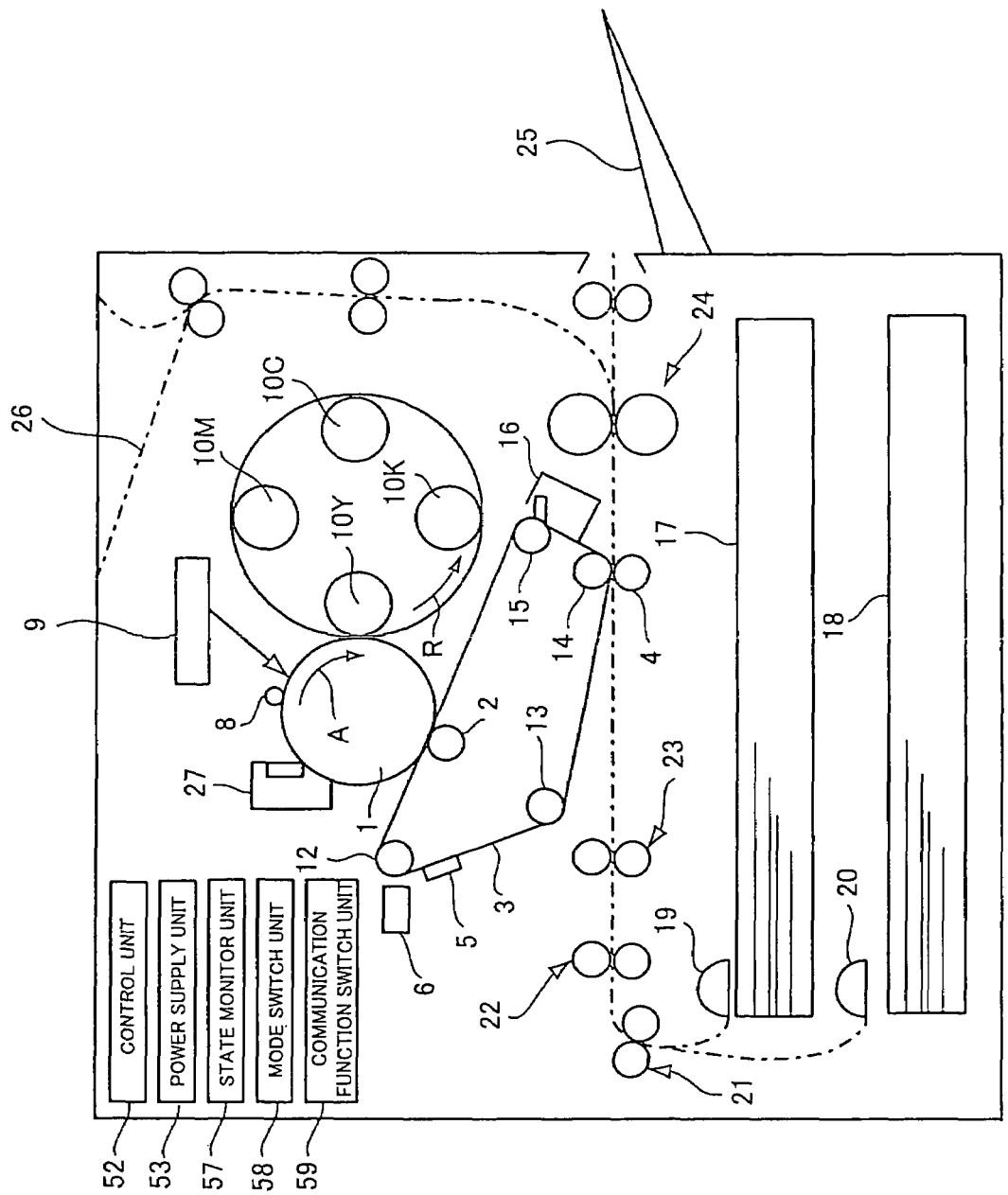
FIG. 1 is a schematic view showing an electrophotographic full-color printer which is of an example of an image forming apparatus according to the embodiment of the present invention.

FIG. 1 is a schematic view showing an electrophotographic full-color printer which is of an example of an image forming apparatus according to the embodiment of the present invention.

Referring to FIG. 1, the full-color printer has an image forming unit including a photosensitive drum (hereinafter simply referred to as "photosensitive body") 1, a charging roller 8, an exposure device 9, a development assembly 10, an intermediate transfer belt 3, a primary transfer device 2, a cleaner device 27, a secondary transfer device 4, a belt cleaner 16, recording-paper cassettes 17 and 18, drawing rollers 19 and 20, roller pairs 21, 22, and 23, a fixing device 24, and paper-exit trays 25 and 26. The photosensitive body 1 is rotated in a direction of an arrow A. The charging roller 8 charges the photosensitive body 1. The exposure device 9 irradiates the photosensitive body 1 with exposure light to form an electrostatic latent image. The development assembly 10 develops the electrostatic latent image formed on the photosensitive body 1 using toner. The intermediate transfer belt 3 receives transfer of the toner image formed on photo sensitive body 1. The primary transfer device 2 transfers the toner image, formed on the photosensitive body 1, to the intermediate transfer belt 3. The cleaner device 27 removes the toner which remains on the photosensitive body 1 after the toner image is transferred to the intermediate transfer belt 3. The secondary transfer device 4 transfers the toner image, transferred to the intermediate transfer belt 3, to the recording paper. The belt cleaner 16 removes the toner which remains on the intermediate transfer belt 3 after the toner image is transferred to the recording paper. The pieces of recording paper are accommodated in the recording-paper cassettes 17 and 18. The drawing rollers 19 and 20 draw the recording paper from the recording-paper cassettes 17 and 18 respectively. The roller pairs 21, 22, and 23 feed the recording paper, drawn into a conveyance path by drawing roller 19 or 20, to a nip portion between the intermediate transfer belt 3 and the secondary transfer device 4. The fixing device 24 fixes the toner image, transferred from the intermediate transfer belt 3, onto the recording paper. The recording paper to which the fixation has been performed exits to the paper-exit tray 25 or 26.

In addition to the image forming unit, the full-color printer includes a control unit 52, a power supply unit 53, a states monitor unit 57, a mode switch unit 58, and a communication function switch unit 59, and these units perform the power saving function of the image forming apparatus of the embodiment. The units will be described in detail later.

The development assembly 10 includes four development devices 10Y, 10M, 10C, and 10K for full-color development. The development devices 10Y, 10M, 10C, and 10K develop the electrostatic latent images on the photosensitive body 1 with yellow (Y) toner, magenta (M) toner, cyan (C) toner, and black (B) toner respectively. In developing the electrostatic latent image with each color of toner, the development assembly 10 is rotated in a direction of an arrow R by a motor (not shown), and the electrostatic latent image is aligned such that the development device having the corresponding color abut on the photosensitive body 1.

The four-color toner images developed on the photosensitive body 1 are sequentially transferred to the intermediate transfer belt 3 by the primary transfer device 2, and four-color toner images are superposed on the photosensitive body 1. The intermediate transfer belt 3 is tensioned by rollers 12, 13, 14, and 15. The roller 12 functions as a drive roller connected to a drive source (not shown) to drive the intermediate transfer belt 3. The roller 13 functions as a tension roller which adjusts tension of the intermediate transfer belt 3. The roller 14 functions as a backup roller of the secondary transfer device 4.

The belt cleaner 16 is provided at a position where the belt cleaner 16 faces the roller 15 across the intermediate transfer belt 3, and the remaining toner on the intermediate transfer belt 3 is scraped out with a cleaner blade.

The recording paper drawn into the conveyance path from the recording-paper cassette 17 or 18 by the drawing roller 19 or 20 is fed to the nip portion, i.e., to the abutment portion of the secondary transfer device 4 and the intermediate transfer belt 3 by the roller pairs 21, 22, and 23.

The toner image formed on the intermediate transfer belt 3 is transferred onto the recording paper at the nip portion, the toner image is fused and fixed to the recording paper by the fixing device 24, and the recording paper exits to the paper-exit tray 25 or 26.

A reflection type optical sensor 6 is arranged while facing the intermediate transfer belt 3, and the optical sensor 6 detects light reflected from a reflection foil 5 on the intermediate transfer belt 3. A detection signal of the reflected light is utilized as a reference signal for controlling timing for image forming by the exposure device 9 or toner-image transfer.

Each of the development devices 10Y, 10M, 10C, and 10K includes an exchangeable toner cartridge (not shown), a development roller (not shown) which imparts a development bias, a toner supply device (not shown) which supplies the toner to the development roller, and a conveyance device (not shown).

A process of forming the image with the full-color printer having the above configuration will be described below.

A voltage is applied to the charging roller 8 to uniformly charge a surface of the photosensitive body 1 at a predetermined negative potential of the charged portion. The exposure device 9 performs the exposure such that an image portion on the charged photosensitive body 1 becomes a predetermined potential of the exposed portion, which allows the electrostatic latent image to be formed. That is, the electrostatic latent image corresponding to the image is formed by turning on and off the exposure device 9 based on an image signal supplied from a control device (not shown).

The development bias is applied to the development rollers of the development devices 10Y, 10M, 10C, and 10K, and the development bias is previously set in each color. When the electrostatic latent image passing through the position of the development roller, the electrostatic latent image is developed with the toner and visualized as the toner image. The toner image is transferred to the intermediate transfer belt 3 by the primary transfer device 2, and the toner image is transferred to the recording paper by the secondary transfer device 4. Then, the toner image is conveyed to the fixing device 24. In the full-color printing, after the four colors of the toner are superposed on the belt, the four colors of the toner are transferred to the recording paper. The toner remaining on the photosensitive body 1 is removed and collected by the cleaner device 27.

The power saving function of the image forming apparatus of the embodiment will be described below.

Figure 2:
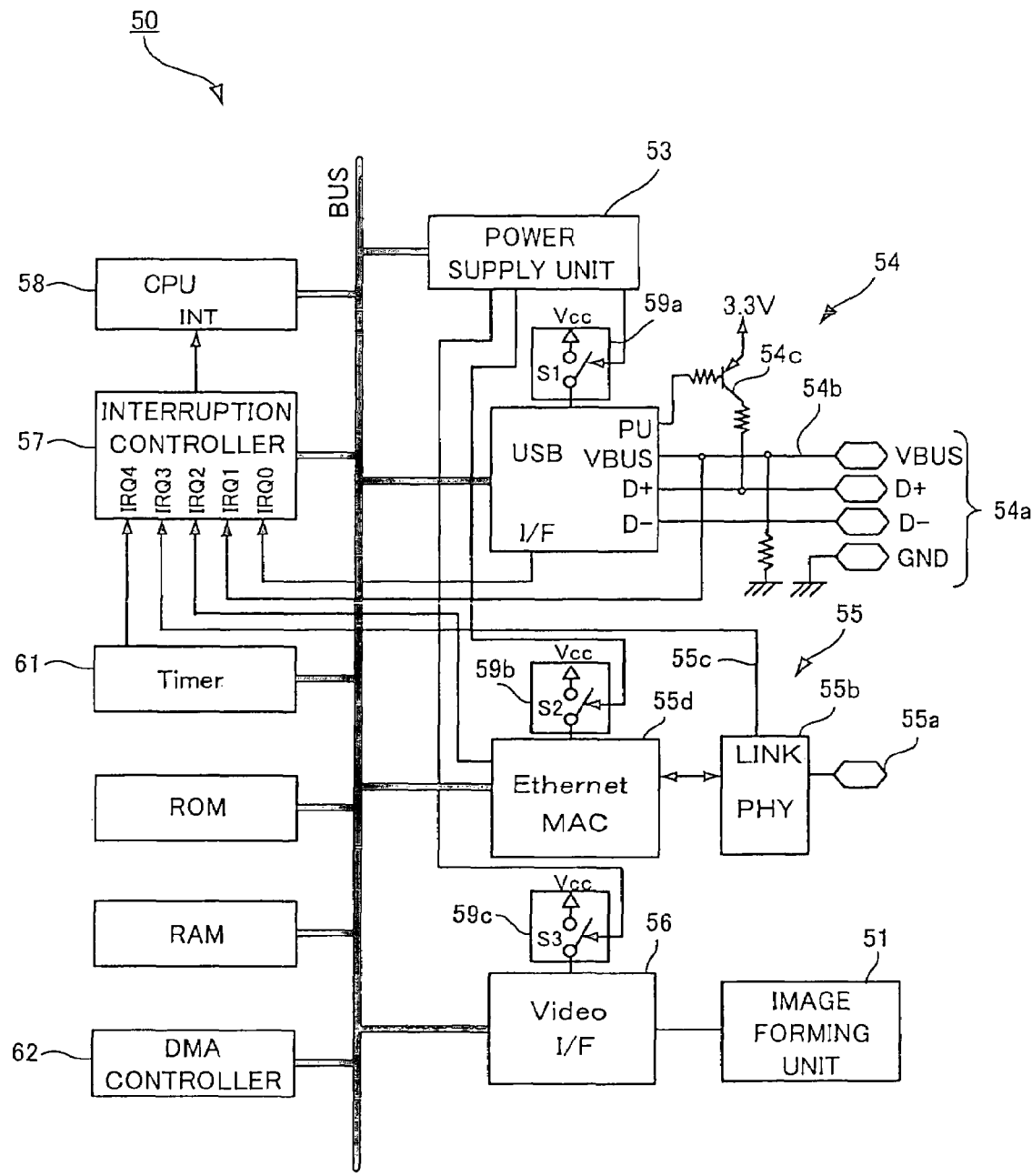
FIG. 2 is a block diagram showing the image forming apparatus having a power saving function according to the embodiment of the present invention.

FIG. 2 is a block diagram showing an image forming apparatus having a power saving function according to the embodiment of the present invention.

Referring to FIG. 2, an image forming apparatus 50 includes an image forming unit 51, the power supply unit 53, a USB interface 54, an Ethernet interface 55, a video interface 56, the states monitor unit (interruption controller) 57, the mode switch unit (CPU: Central Processing Unit) 58, and a switch S1 (59a), a switch S2 (59b), and a switch S3 (59c). The image forming unit 51 has the same configuration as the full-color printer shown in FIG. 1. The image forming unit 51 includes a communication interface which mediates data communication. The image forming unit 51 receives image data through the communication interface to form the image based on the received image data. The power supply unit 53 supplies the electric power in one of power supply modes of an operation mode and a power saving mode. The electric power necessary to the image formation is supplied in the operation mode, and stand-by electric power is supplied in the power saving mode. The USB interface 54 receives the image data inputted through a USB cable. The Ethernet interface 55 receives the image data inputted through Ethernet. The video interface 56 outputs the image data to the image forming unit 51. The states monitor unit 57 monitors a connection state and a non-connection state of each of the communication interfaces. In the case where either of a change from the non-connection state to the connection state or a change from the connection state to the non-connection state is detected by the states monitor unit 57 while the power supply unit 53 is in the power saving mode, the mode switch unit 58, in response to the detection, switches the power supply unit 53 to the operation mode. The switch S1 (59a), the switch S2 (59b), and the switch S3 (59c) turn on and off the USB interface 54, the Ethernet interface 55, and the video interface 56 respectively. The switches S1, S2, and S3 are turned on and off by the control from the power supply unit 53.

The switch S1 (59a), the switch S2 (59b), and the switch S3 (59c) in the embodiment correspond to the communication function switch unit 59. Further, in the embodiment, the power supply unit 53 has the communication function switch unit 59 which switches the communication interface in the power saving mode between a communication enabling mode and a communication disabling mode. When the operation mode is switched to the power saving mode, the mode switch unit 58 is configured to maintain the communication interface at the communication enabling mode or to transfer the communication interface to the communication disabling mode, according to the connection mode or non-connection mode of the communication interface which is detected by the states monitor unit 57. Operation electric power necessary to data communication performed by the communication interface is supplied in communication enabling mode, and stand-by electric power having a communication disabled level is also supplied to the communication interface in the communication disabling mode.

A block diagram of the power saving function in a conventional image forming apparatus will be shown by way of reference example.

Figure 3:
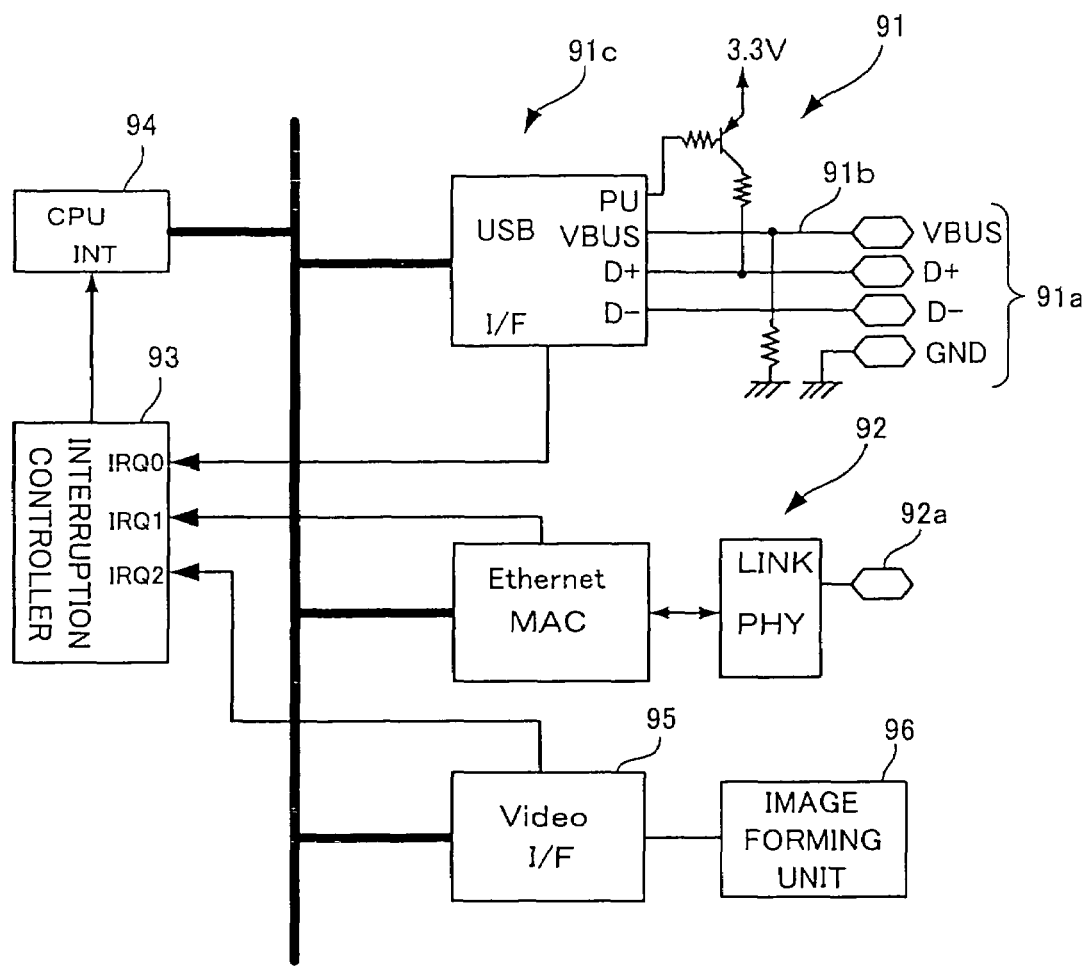
FIG. 3 is a block diagram showing a power saving function in a conventional image forming apparatus.

FIG. 3 is a block diagram showing the power saving function in the conventional image forming apparatus.

Referring to FIG. 3, the image forming apparatus includes a USB interface 91, an Ethernet interface 92, and a video interface 95 which are of the communication interface mediating the data communication. The image forming apparatus also includes CPU 94, an interruption controller 93, and an image forming unit 96. In the conventional image forming apparatus, for USB, when the USB cable is connected to a USB connector 91a, a USB interface 91c asserts IRQ (Interrupt Request) 0 of the interruption controller 93 to post the connection of the USB connector 91a to CPU 94, CPU 94 turns on USB pull-up to cause DMA (Direct Memory Access) to be in a start state, and CPU 94 performs the control such that the data can be transmitted and received through the USB interface 91.

In the power saving mode, it is desirable that the operation of the unnecessary functional block be stopped as much as possible. Therefore, when the USB cable is in the non-connection state in switching the image forming apparatus to the power saving mode, it is necessary to stop the function of the USB interface 91c. In the conventional technology shown in FIG. 3, whether VBUS 91b which is of a power line of the USB interface 91c exceeds a predetermined potential or not is determined by reading the potential level of an input port PU of the USB interface 91c through a software program, and thereby it is determined whether the USB is in the connection state or in the non-connection state. However, when the USB cable is connected to the USB connector 91a at the same time when the image forming apparatus is switched to the power saving mode, sometimes the potential of VBUS 91b becomes unstable due to chattering. In this case, an L level (USB is in the non-connection state) is read as a value of the input port. As a result, although the USB cable is connected, the USB functional block is stopped, which causes a problem that the image forming apparatus enters the power saving mode while the communication cannot be performed.

Therefore, as shown in FIG. 2, the image forming apparatus of the embodiment includes the power supply unit 53, the states monitor unit 57, and the mode switch unit 58. The power supply unit 53 supplies the electric power in one of the power supply modes of the operation mode, in which the electric power necessary to the image formation is supplied, and the power saving mode in which the stand-by electric power is supplied. The states monitor unit 57 monitors the connection state and the non-connection state of each of the communication interfaces (USB interface 54 and Ethernet interface 55). In the case where either of a change from the non-connection state to the connection state or a change from the connection state to the non-connection state is detected by the states monitor unit 57 while the power supply unit 53 is in the power saving mode, the mode switch unit 58, in response to the detection, switches the power supply unit 53 to the operation mode.

According to the image forming apparatus of the embodiment, for example, when the states monitor unit 57 detects transition of the potential of a signal line 54b indicating the connection state of the USB interface 54, the mode switch unit 58 causes the power supply unit 53 to transfer to the operation mode according to the detection and causes the interface to be in the communication enabling state, when either of a change from the non-connection state to the connection state or a change from the connection state to the non-connection state is detected. Therefore, because the power supply unit 53 is prevented from transiting to the power saving mode while the chattering does not sink down, usability can be improved such that the generation of incomplete data-capture is prevented.

For the Ethernet interface 55, a PHY chip 55b located in a post-stage of an Ethernet connector 55a is connected to IRQ3 of the interruption controller 57, and presence or absence of data link establishment, i.e., either of a change from the non-connection state to the connection state or a change from the connection state to the non-connection state is detected by a LINK status output signal 55c of the PHY chip 55b. In response to the detection of either of a change, the mode switch unit 58 switches the power supply unit 53 to the operation mode.

With reference to the preferable method of detecting the change in connection state in the USB interface 54 and the Ethernet interface 55, there is a method of inputting a potential signal and the LINK status output signal 55c of VBUS 54b to the interruption controller 57 to detect edges of the signals with the interruption controller 57.

Figure 4B:
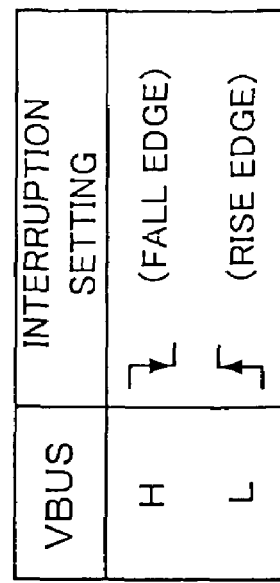
FIG. 4(a) and FIG. 4(b) show a method of detecting a connection state and a non-connection state of a USB interface according to the embodiment.
Figure 4A:
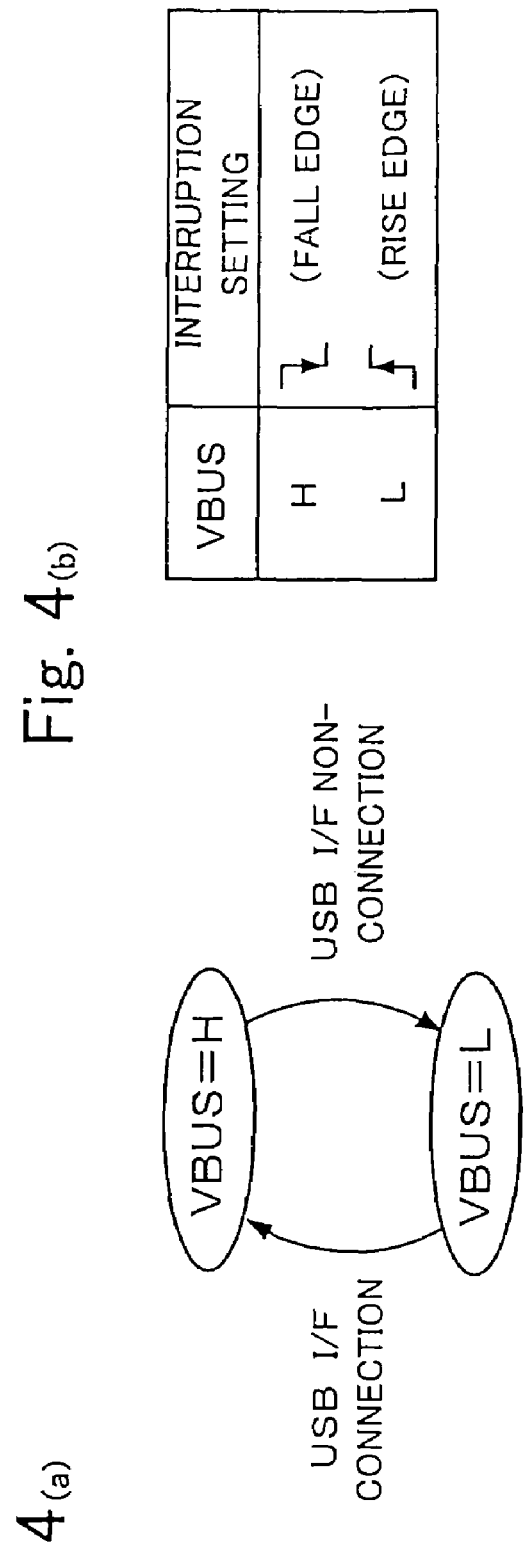

FIG. 4(a) and FIG. 4(b) show a method of detecting the connection state and the non-connection state of the USB interface.

As shown in FIG. 4(a), when the USB interface 54 (see FIG. 2) is in the connection state, VBUS 54b is in an H level and can only transit to the L level. Therefore, as shown in FIG. 4(b), fall-edge detection is set in the interruption setting. Alternatively, when the USB interface 54 is in the non-connection state, VBUS 54b is in the L level and can only transit to the H level. Therefore, rise-edge detection is set in the interruption setting. The mode switch unit (CPU) 58 switches the power saving mode to the operation mode based on the interruptions.

Examples of the method of determining whether the USB interface is in the connection state include a method of reading a VBUS input signal level of the USB interface through a software program and a method in which the connection state of the USB interface is evaluated by availability of communication through the USB interface. However, the present invention is not particularly limited to the above methods.

Figures 5A, 5B:
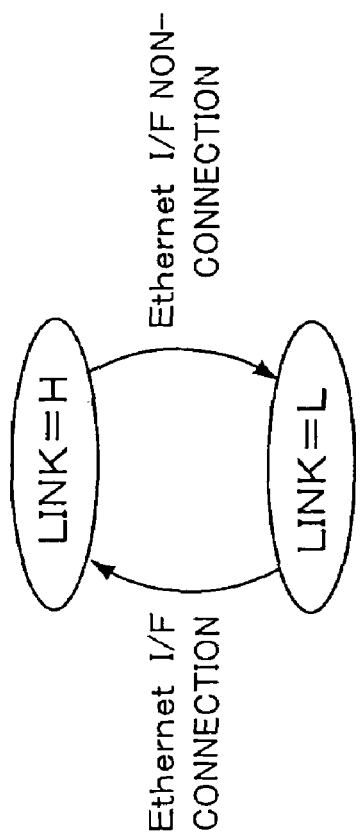
FIG. 5(a) and FIG. 5(b) show a method of detecting the connection state and the non-connection state of an Ethernet interface according to the embodiment.

FIG. 5(a) and FIG. 5(b) show a method of detecting the connection state and the non-connection state of the Ethernet interface.

In the case of the Ethernet interface, the connection and the non-connection of the interface is evaluated by utilizing a characteristic in which the data is not transmitted and received unless the data link is established. As shown in FIG. 5(a), when the data link is established, the LINK status output signal 55C of the PHY chip 55b is in the assert state (H level in the embodiment) and can only transit to the L level. Therefore, as shown in FIG. 5(b), the fall-edge detection is set in the interruption setting. When the data link is not established, the LINK status output signal 55C is in a negate state (L level) and can only transit to the H level. Therefore, the rise-edge detection is set in the interruption setting. The mode switch unit (CPU) 58 switches the power saving mode to the operation mode based on the interruptions.

Examples of the method of determining whether the Ethernet interface is in the connection state include a method of reading the LINK status output signal 55C of the Ethernet interface through a software program and a method in which the connection state of the Ethernet interface is evaluated by availability of communication through the Ethernet interface. However, the present invention is not particularly limited to the above methods.

Figure 6:
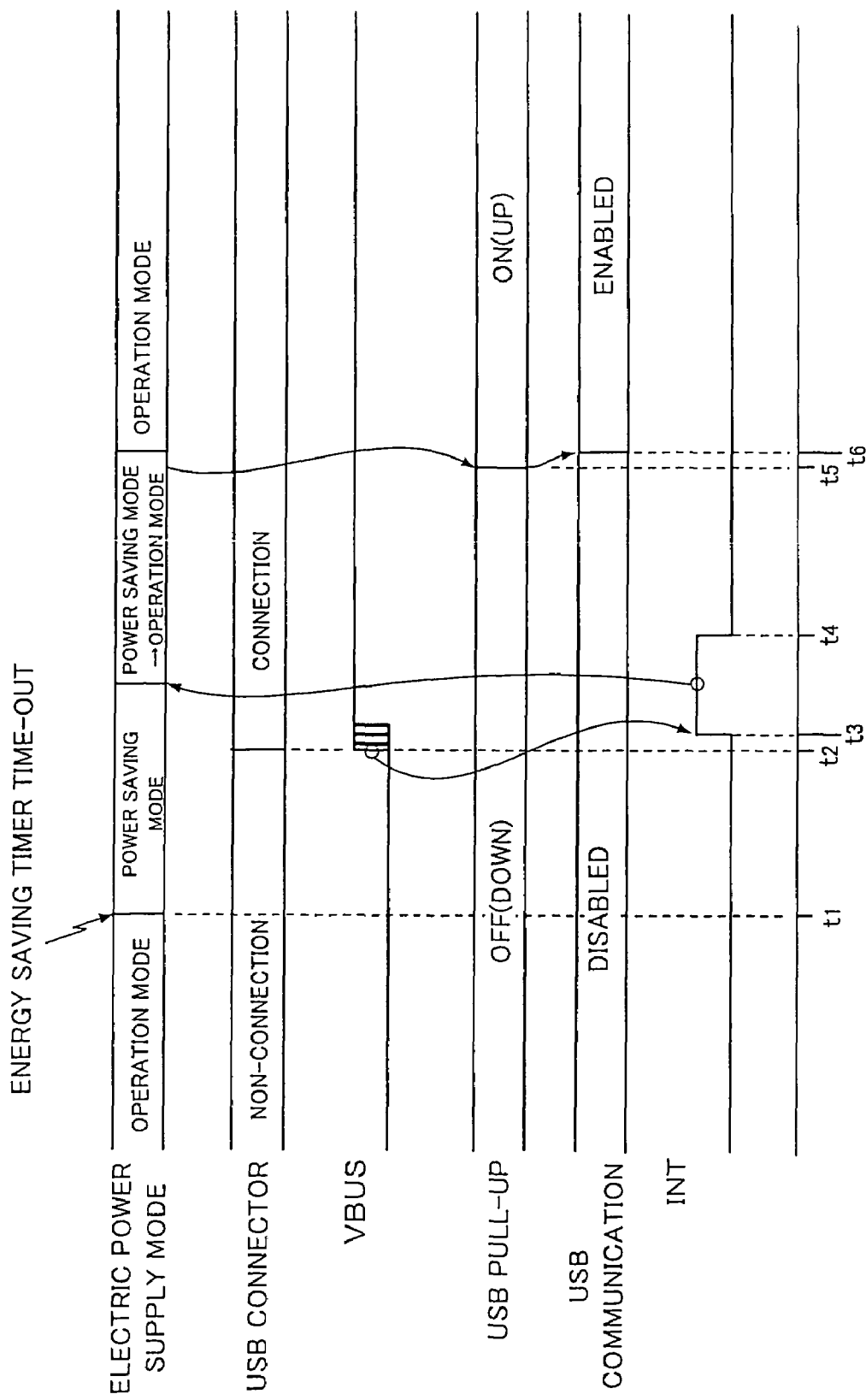
FIG. 6 is a timing chart showing mode switch of the USB interface according to the embodiment.

FIG. 6 is a timing chart showing the mode switch of the USB interface in the embodiment.

As shown in FIG. 6, for the image forming apparatus in the operation mode, when the data is not inputted and outputted for a predetermined time, a timer 61 (see FIG. 2) times out to switch the image forming apparatus to the power saving mode (time t1). When the USB cable is connected to the USB connector 54a (see FIG. 2) during the power saving mode (time t2), CPU is interrupted (INT) because the potential of VBUS is changed (time t3), which releases the power saving mode to start the transition to the operation mode (time t4). After the image forming apparatus is switched from the power saving mode to the operation mode to prepare the reception of the data from the USB interface, the communication with a host device is started (time t5) by turning on the USB pull-up 54c and ended (time t6) to shift to the operation mode.

The above operation performed in the embodiment can avoid a risk of falling into malfunction such as the generation of the incomplete data-capture, unlike the technique disclosed in Japanese Patent Laid-Open No. 2000-353032 in which the connection state is falsely detected due to the chattering when the USB connector is inserted in switching the image forming apparatus from the power saving mode to the operation mode.

The USB interface has a scheme in which the availability of the data transfer is posted to the host device side by pulling up a positive electrode side D+ of differential data lines D+ and D− (see FIG. 2). When the pull-up is off, the data communication is not performed even if the host device is electrically connected to the device to be communicated. When the USB interface is in the non-connection state, the image forming apparatus is switched to the power saving mode while the pull-up is off.

A modification of the embodiment may be configured to inform the host device by the NAK reply that data cannot be received as a protocol of the USB interface. For the case of a commercially available USB interface IC, IC has a function of automatically performing the NAK reply when the data cannot be received because a reception buffer is filled up in IC. An embodiment in which the function of automatically performing the NAK reply is used will be described below. In the embodiment, even if the USB interface is in the non-connection state, DMA is caused to be in the stopped stated while the pull-up is on, and the image forming apparatus is switched to the power saving mode. When the USB interface is connected in the power saving mode, because the potential of the power line VBUS 54b (see FIG. 2) is changed, the image forming apparatus is returned to the operation mode from the power saving mode according to the change in potential of the power line VBUS 54b. At the same time, the reception data is stored in the reception buffer in IC since DMA is not started in the USB interface IC, and then the host device temporarily stop the data transfer because IC automatically sends the NAK reply when the reception buffer is filled up. When the return to the operation mode from the power saving mode is finished, DMA is started in the USB interface IC, which starts a process of transferring the reception data to RAM to resume the USB data receiving operation.

For the image forming apparatus of the embodiment having the plural communication interfaces, in the mode switch process associated with the change in connection state of the communication interface, the process is performed only in the portion where the data may be transmitted and received by the communication interface whose connection state is changed.

For example, when only the USB interface is changed from the non-connection state to the connection state, the portion associated with the data transmission and reception of Ethernet, i.e., MAC (Media Access Controller) 55d is kept in the power saving mode, which allows the power saving effect to be further improved.

The process of switching the image forming apparatus of the embodiment from the operation mode to the power saving mode will be described below.

Figure 7:
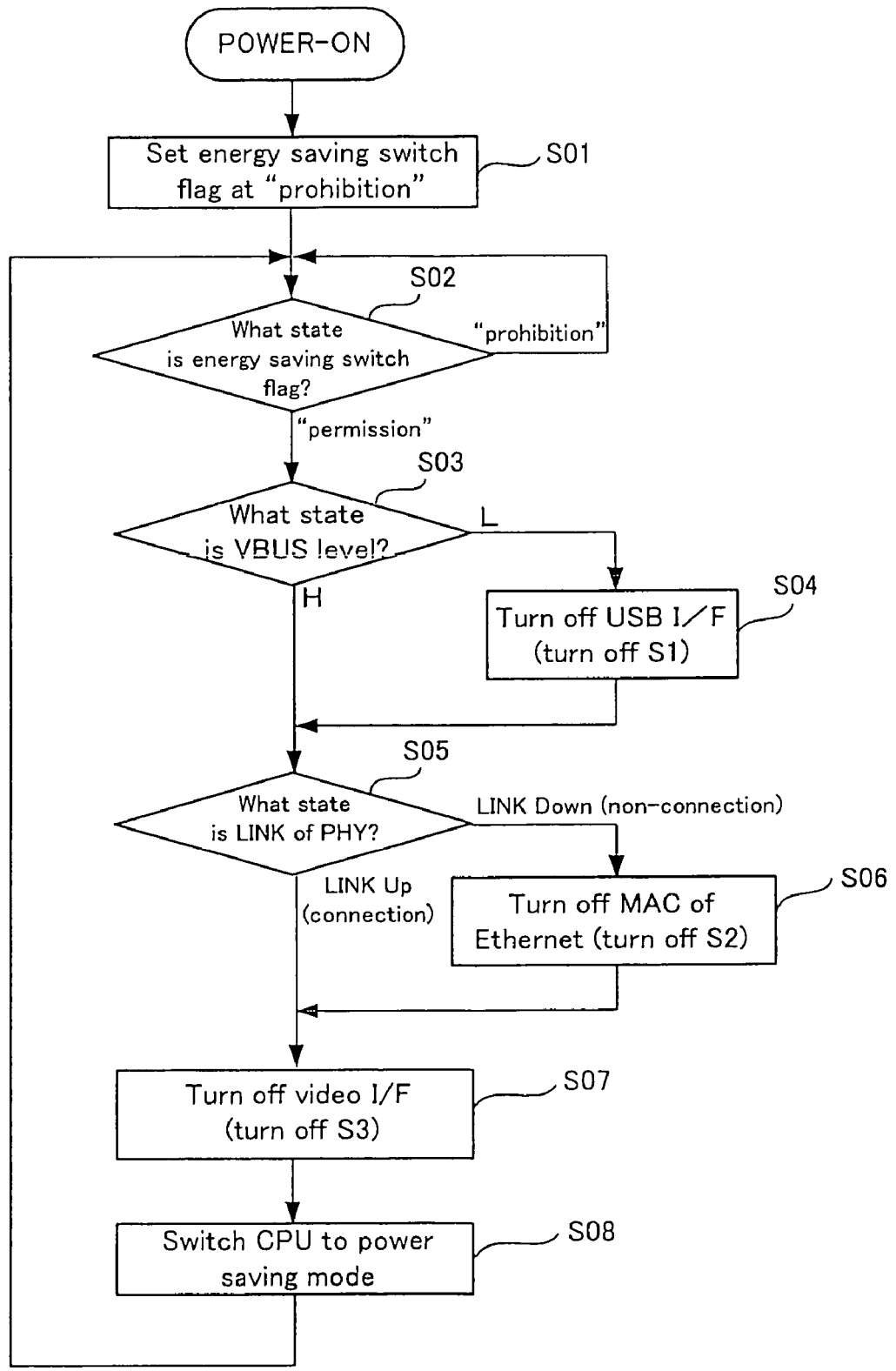
FIG. 7 is a flowchart showing a process of switching image forming apparatus from an operation mode to a power saving mode according to the embodiment.
Figure 8:
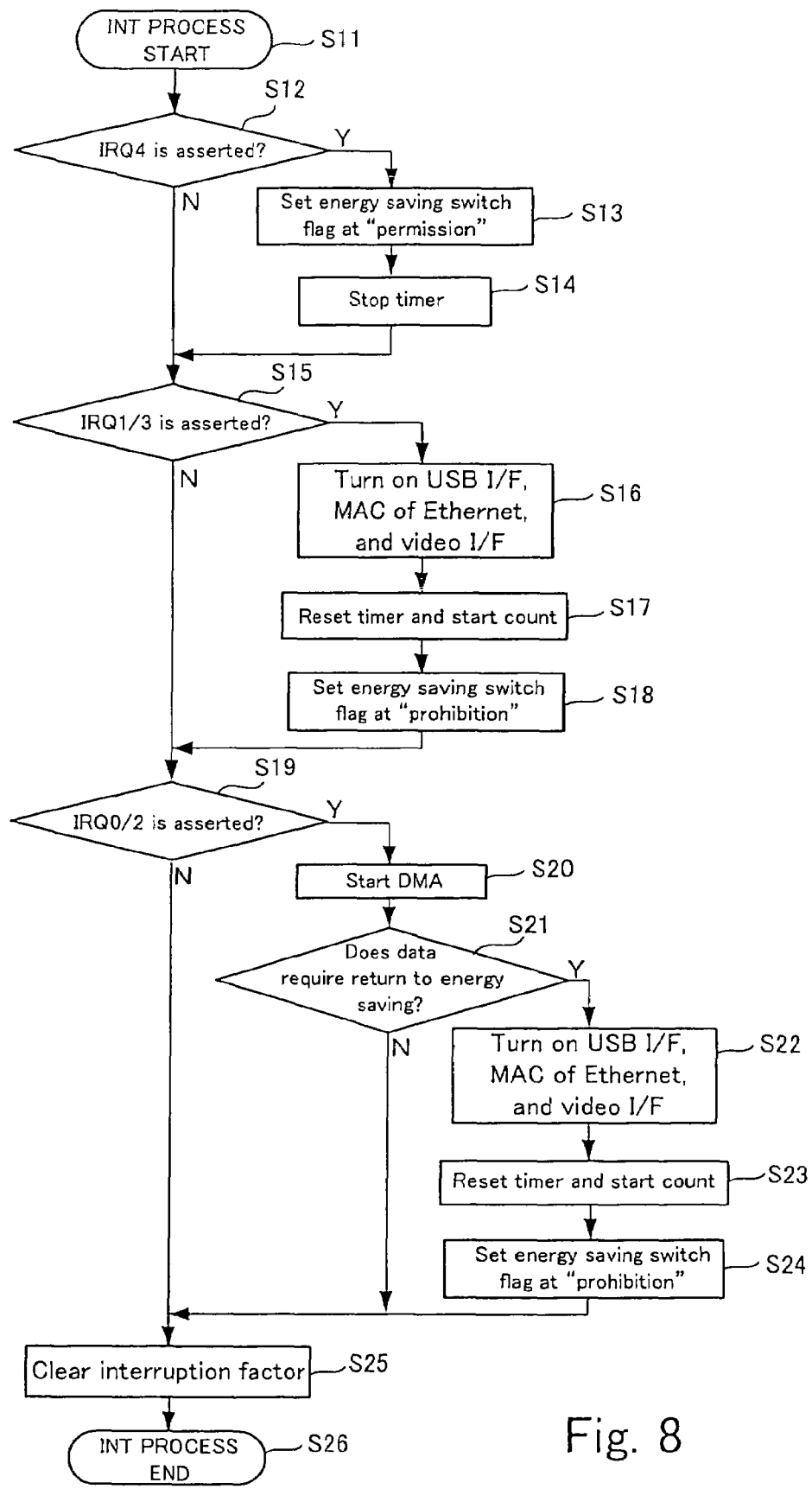
FIG. 8 is a flowchart showing an interruption process according to the embodiment.

FIG. 7 is a flowchart showing the process of switching the image forming apparatus from the operation mode to the power saving mode, and FIG. 8 is a flowchart showing the interruption process.

As shown in FIG. 7, after the power is turned on, a status value of "prohibition" is written in an energy saving switch flag which is of a software variable (Step S01). In Step S02, it is determined whether the energy saving switch flag is set at "prohibition" or not. The energy saving switch flag is set at either "permission" or "prohibition" through the interruption process shown in FIG. 8. The flow stays in Step S02 until the energy saving switch flag is updated through the interruption process.

In the interruption process shown in FIG. 8, when any one of IRQ0 to IRQ4 of the interruption controller (states monitor unit) 57 (see FIG. 2) is asserted, CPU (mode switch unit) 58 is interrupted. In the case where CPU 58 is in the power saving mode which is CPU 58's own energy saving function, CPU 58 is automatically switched from the power saving mode to the operation mode, and the INT process is started (Step S11).

As shown in FIG. 2, IRQ0 of the interruption controller 57 monitors the event of the data transmission and reception from the USB interface 54, IRQ1 monitors the potential of the power line VBUS 54b of the USB interface 54, IRQ2 monitors the event of the data transmission and reception from MAC 55d of the Ethernet interface 54, and IRQ3 monitors the LINK status of the PHY chip 55b of the Ethernet interface 54, and IRQ4 monitors the time-out of the timer 61.

When the interruption process (see FIG. 8) is started in Step S11, in Step S12 it is determined whether IRQ4 is asserted or not.

In Step S12, when it is determined that IRQ4 is asserted, namely, when the timer 61 times out, the energy saving switch flag is updated to "permission" (Step S13), the timer 61 is stopped (Step S14), and the flow goes to Step S15.

On the other hand, when it is determined that IRQ4 is not asserted, the flow goes to Step S15.

In Step S15, it is determined whether IRQ1 or IRQ3 is asserted or not.

In Step S15, when it is determined that IRQ1 or IRQ3 is asserted, the flow goes to Step S16. In Step S16, the electric power is supplied to the interfaces by closing the switch S1 (59a) arranged between the power supply unit 53 and the USB interface 54, the switch S2 (59b) arranged between the power supply unit 53 and MAC 55d of the Ethernet interface 55, and the switch S3 (59c) arranged between the power supply unit 53 and the video interface 56. After the timer 61 is reset, the count operation is started (Step S17). Then, the energy saving switch flag is updated to "prohibition" (Step S18), and the flow goes to Step S19.

On the other hand, when it is determined that both IRQ1 and IRQ3 are not asserted, the flow goes to Step S19.

In Step S19, it is determined whether IRQ0 or IRQ2 is asserted or not.

In Step S19, when it is determined that IRQ0 or IRQ2 is asserted, namely, when it is determined that the USB data or the Ethernet data is received, the flow goes to Step S20 In Step S20, the DMA controller 62 is caused to be started.

In Step S21, it is determined whether the data has the necessity to return to the operation mode from the power saving mode or not.

In Step S21, when it is determined that the data has the necessity to return to the operation mode from the power saving mode, the flow goes to Step S22. In Step S22, the electric power is supplied to the interfaces by closing the switch S1 (59*a*) arranged between the power supply unit 53 and the USB interface 54, the switch S2 (59*b*) arranged between the power supply unit 53 and MAC 55*d* of the Ethernet interface 55, and the switch S3 (59*c*) arranged between the power supply unit 53 and the video interface 56. After the timer 61 is reset, the count operation is started (Step S23). Then, the energy saving switch flag is updated to "prohibition" (Step S24), and the flow goes to Step S25.

On the other hand, when it is determined that the data does not have the necessity to return to the operation mode from the power saving mode, the flow goes to Step S25.

Also, in Step S19, when it is determined that both IRQ0 and IRQ2 are asserted, the flow goes to Step S25.

In Step S25, the interruption factor is cleared, and the interruption process shown in FIG. 8 is ended.

When the interruption process is ended, the flow returns to Step S02 of the flowchart shown in FIG. 7.

In Step S02 of the flowchart shown in FIG. 7, it is determined whether the energy saving switch flag is in the status of "prohibition" or "permission".

In Step S02, because the energy saving switch flag is in the "prohibition" status until the timer 61 (see FIG. 2) times out, the standby state is maintained.

On the other hand, in Step S02, when the energy saving switch flag is changed to the "permission" status, the flow goes to Step S03. In Step S03, it is determined whether the signal level in VBUS 54*b* of the USB interface 54 (see FIG. 2) is in the L level or the H level.

In Step S03, when it is determined that the signal level in VBUS 54*b* is in the L level, it is determined that USB is in the non-connection state, and the switch S1 (59*a*) is turned off to stop the electric power supply to the USB interface (Step S04). Then, the flow goes to Step S05.

On the other hand, in Step S03, when it is determined that the signal level in VBUS 54*b* is in the H level, the flow goes directly to Step S05.

In Step S05, a LINK status is detected in the PHY chip 55*b* of the Ethernet interface, and it is determined whether the LINK status is LINK Down or LINK Up.

In Step S05, when it is determined that the LINK status is LINK Down, it is determined that Ethernet is in the non-connection state, and the switch S2 (59*b*) is turned off to stop the electric power supply to MAC 55*d* of the Ethernet interface (Step S06). Then, the flow goes to Step S07.

On the other hand, when it is determined that the LINK status is LINK Up, the flow goes directly to Step S07.

In Step S07, the switch S3 (59*c*) is turned off to stop the electric power supply to the video interface 56, and then the process of CPU 58 is stopped by switching the CPU 58 to the power saving mode.

As described above, when any one of the interruptions of IRQ0 to IRQ3 is generated, CPU 58 returns to the operation mode from the power saving mode. Because the timer 61 is stopped in the power saving mode, the interruption is not generated in IRQ4.

With reference to the function of automatically returning to the operation mode from the power saving mode when the interruption to CPU 58 is asserted, the embodiment utilizes the function incorporated in the general-purpose CPU, so that the detailed description will be omitted.

On the other hand, when the data does not have the necessity to return to the operation mode from the power saving mode although IRQ0 or IRQ2 is asserted by receiving the data from the USB interface or the Ethernet interface, for example, when the data is a ping command or an ARP (Address Resolution Protocol) command, the interruption process is ended while the energy saving switch flag is not changed, i.e., while the energy saving switch flag is kept in "permission". When the interruption process is ended, the energy saving switch flag is kept in "permission", the determination of the connection state is made for the USB interface or the Ethernet interface, and the video interface is turned off. Then, CPU performs the switch operation to the power saving mode again.

Thus, according to the image forming apparatus of the embodiment having the above configuration, the malfunction never occurs even if the communication interface is connected during switching the image forming apparatus from the operation mode to the power saving mode and during the power saving mode, and the power consumption in the power saving mode can be decreased more than a conventional technique.

According to the image forming apparatus of the embodiment having the above configuration, when the signal is inputted to the interface switched to the power saving mode from the operation mode before the interface returns to the operation mode again, the incomplete input data-capture can be prevented.

The power supply unit may include a communication function switch unit which switches, in the power saving mode, the communication interface between a communication enabling mode in which operating electric power necessary for data communication performed by the communication interface is supplied to the communication interface, and a communication disabling mode in which stand-by electric power having a level at which communication is disabled is supplied to the communication interface. The power supply unit also may include the mode switch unit causes the communication interface to be kept in the communication enabling mode according to the connection state of the communication interface detected by the states monitor unit, and the mode switch unit causes the communication interface to be switched to the communication disabling mode according to the non-connection state of the communication interface detected by the states monitor unit, when the operation mode is switched to the power saving mode.

According to the image forming apparatus of the embodiment having the above configuration, the image forming apparatus can be operated more securely.

Additionally, the image forming apparatus of the embodiment may include a communication interface having a power line, wherein the states monitor unit detects the connection state and the non-connection state of the communication interface based on a potential of the power line of the communication interface.

According to the image forming apparatus of the embodiment having the above configuration, for example, when the USB interface is used as the communication interface, the connection state and the non-connection state of the communication interface can be detected based on the potential of the power line of USB. Therefore, the image forming apparatus of the embodiment can easily be realized.

Moreover, the image forming apparatus of the embodiment may include a communication interface which mediates the data communication while a data link is established, wherein the states monitor unit detects the connection state and the non-connection state of the communication interface based on presence or absence of the data link establishment of the communication interface.

According to the image forming apparatus of the embodiment having the above configuration, for example when the Ethernet interface is used as the communication interface, the connection state and the non-connection state of the communication interface can be detected based on a LINK status output signal of a PHY chip of the Ethernet interface. Therefore, the image forming apparatus of the embodiment can easily be realized.

Thus, the image forming apparatus in which malfunction can be prevented in switching the modes and power consumption in the power saving mode can be decreased more than ever can be realized according to the embodiment.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

Lastly, the entire disclosure of Japanese Patent Application Publication No. 2005-339552 including specification, claims, drawings and abstract is incorporated herein by reference in its entirety.

What is claimed is:

1. An image forming apparatus having a communication interface which mediates data communication, the image forming apparatus receiving image data through the communication interface to form an image based on the received image data, the image forming apparatus comprising:

a power supply unit which supplies electric power in any one of power supply modes of an operation mode in which the electric power necessary to form the image is supplied, and a power saving mode in which stand-by electric power is supplied;

a states monitor unit which monitors a connection state and a non-connection state of the communication interface; and a mode switch unit which switches the power supply unit to the operation mode, in response to detection by the states monitor unit of either of a change from the non-connection state to the connection state or a change from the connection state to the non-connection state, when the power supply unit is in the power saving mode, wherein the mode switch unit holds the power supply unit in the operation mode even when the states monitor unit detects the change from the connection state to the non-connection state after detecting the change from the non-connection state to the connection state.

2. An image forming apparatus according to claim 1, wherein the power supply unit includes a communication function switch unit which switches, in the power saving mode, the communication interface between a communication enabling mode and a communication disabling mode, the communication enabling mode in which operating electric power necessary for data communication performed by the communication interface is supplied to the communication interface, the communication disabling mode in which stand-by electric power having a level at which communication is disabled is supplied to the communication interface, and the mode switch unit causes the communication interface to be kept in the communication enabling mode according to the connection state of the communication interface detected by the states monitor unit, and the mode switch unit causes the communication interface to be switched to the communication disabling mode according to the non-connection state of the communication interface detected by the states monitor unit, when the operation mode is switched to the power saving mode.

3. An image forming apparatus according to claim 2, comprising a communication interface having a power line, wherein the states monitor unit detects the connection state and the non-connection state of the communication interface based on a potential of the power line of the communication interface.

4. An image forming apparatus according to claim 2, comprising a communication interface which mediates the data communication while a data link is established, wherein the states monitor unit detects the connection state and the non-connection state of the communication interface based on presence or absence of the data link establishment of the communication interface.

5. An image forming apparatus according to claim 1, comprising a communication interface having a power line, wherein the states monitor unit detects the connection state and the non-connection state of the communication interface based on a potential of the power line of the communication interface.

6. An image forming apparatus according to claim 1, comprising a communication interface which mediates the data communication while a data link is established, wherein the states monitor unit detects the connection state and the non-connection state of the communication interface based on presence or absence of the data link establishment of the communication interface.

* * * * *